United States Patent
Hayakawa

(10) Patent No.: US 9,471,842 B2
(45) Date of Patent: Oct. 18, 2016

(54) IMAGE PROCESSING APPARATUS, IMAGE PROCESSING METHOD, AND STORAGE MEDIUM STORING PROGRAM

(71) Applicant: CANON KABUSHIKI KAISHA, Tokyo (JP)

(72) Inventor: Mizuki Hayakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/633,537

(22) Filed: Feb. 27, 2015

(65) Prior Publication Data
US 2015/0262034 A1  Sep. 17, 2015

(30) Foreign Application Priority Data
Mar. 12, 2014 (JP) .................. 2014-049311

(51) Int. Cl.
G06K 9/46 (2006.01)
G06K 9/34 (2006.01)

(52) U.S. Cl.
CPC ........... *G06K 9/342* (2013.01); *G06K 2209/01* (2013.01)

(58) Field of Classification Search
CPC ... G06K 9/6228; G06K 9/342; G06K 9/6232
USPC .......................................................... 382/195
See application file for complete search history.

(56) References Cited

U.S. PATENT DOCUMENTS 6,115,497 A * 9/2000 Vaezi ................. G06K 9/00456
382/168
8,630,026 B2 1/2014 Hayakawa et al.

FOREIGN PATENT DOCUMENTS

JP 2010-035162 A 2/2010

* cited by examiner

*Primary Examiner* — Ruiping Li
(74) *Attorney, Agent, or Firm* — Fitzpatrick, Cella, Harper & Scinto

(57) ABSTRACT

An image processing apparatus acquires a read image which has been obtained by reading one or a plurality of originals by a reading apparatus and includes an original region corresponding to each of the one or plurality of originals, and specifies an object corresponding to contents of the original in the read image based on a group of pixels corresponding to luminance values smaller than a predetermined luminance value in the acquired read image. If a plurality of objects are specified, it is determined whether the plurality of objects are included in one original region, thereby deciding a candidate region corresponding to each of the one or plurality of original regions.

20 Claims, 10 Drawing Sheets

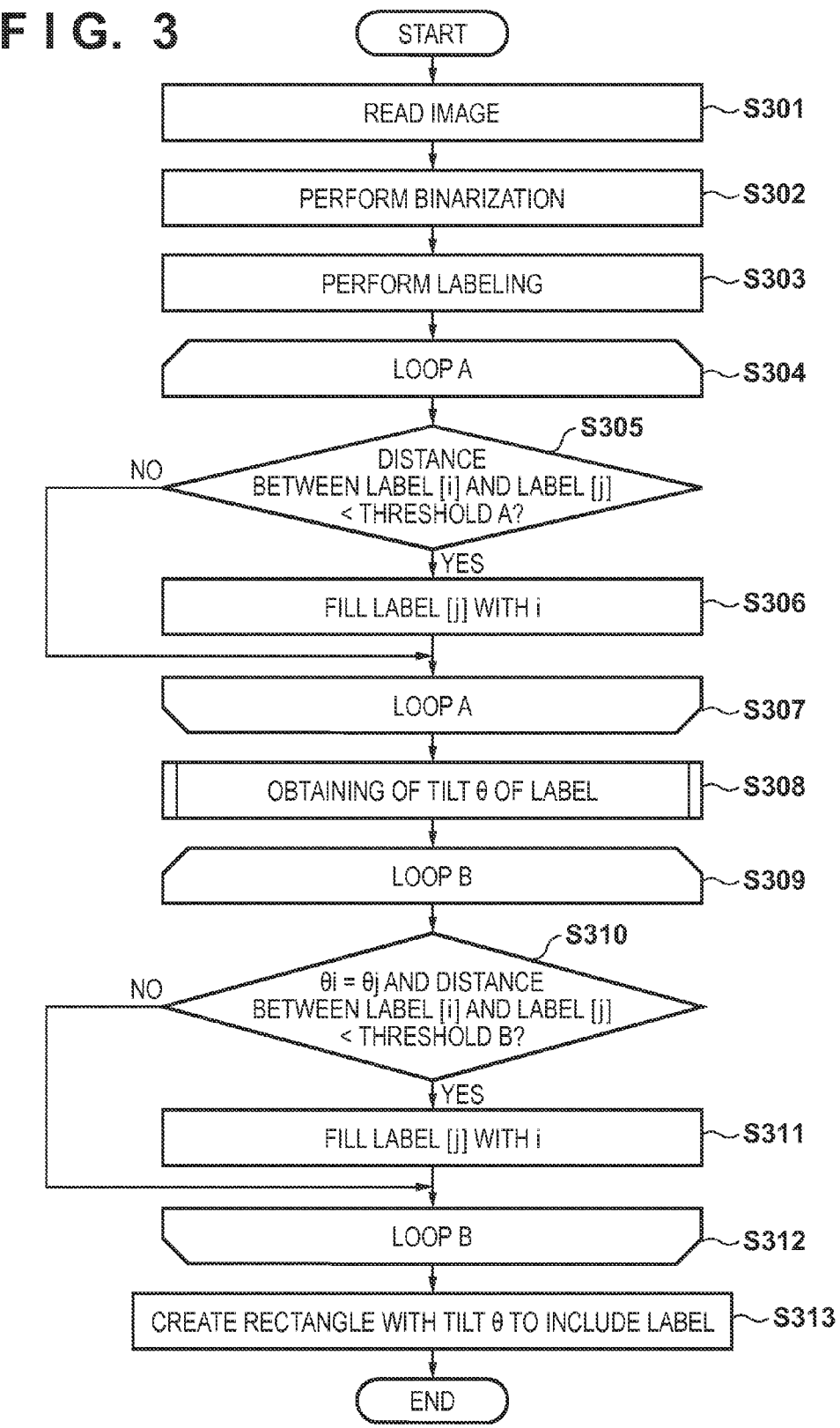

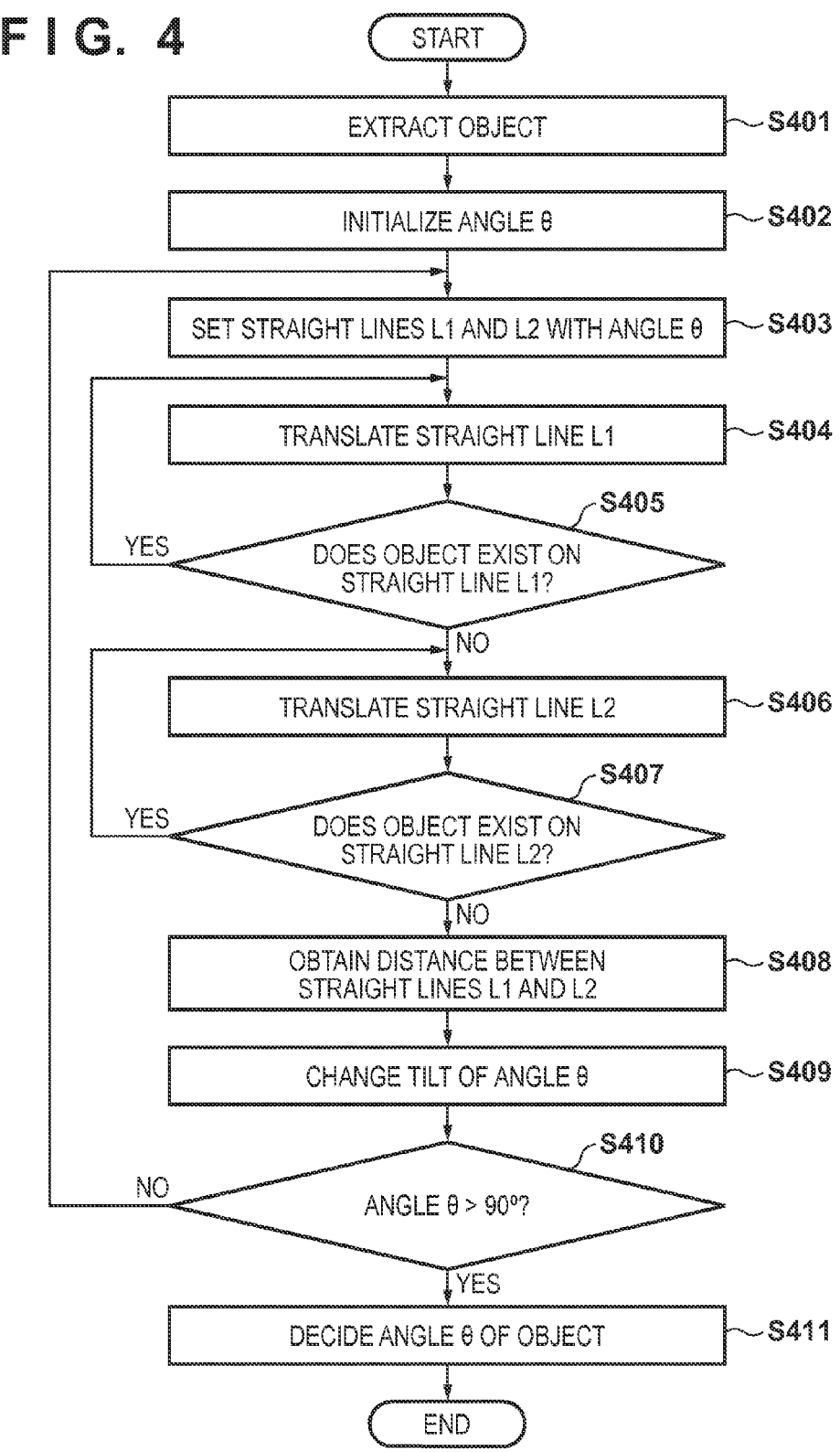

FIG. 5A

RECEIPT
501 ●●●STORE
2010/01/01

○○○
△△△ ¥100
¥200

TOTAL AMOUNT
¥300
AMOUNT RECEIVED
¥500
BALANCE ¥200

●●●●SHOP

○○○ ¥200
△△△ ¥400
―――――――――
TOTAL AMOUNT ¥600

AMOUNT RECEIVED
¥600

BALANCE ¥ 0

F I G. 5B
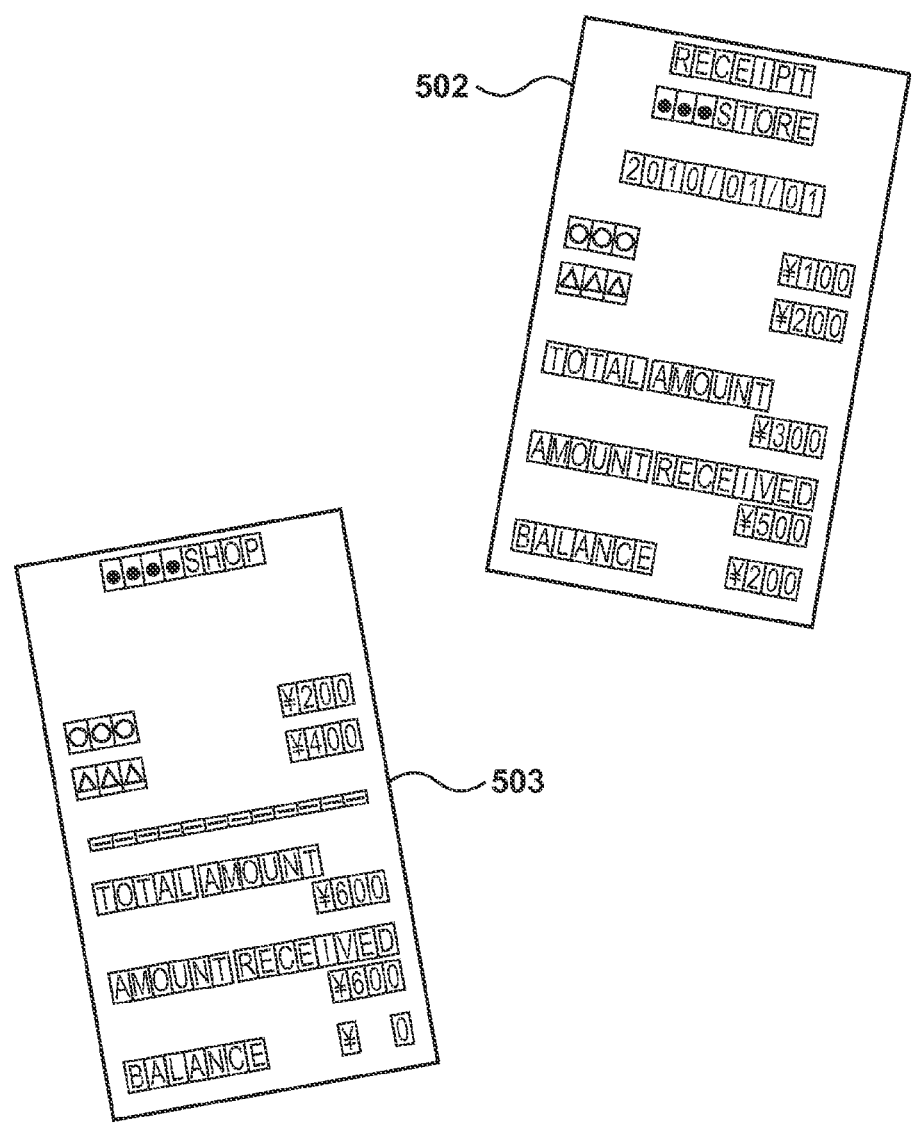

IMAGE PROCESSING APPARATUS, IMAGE PROCESSING METHOD, AND STORAGE MEDIUM STORING PROGRAM

BACKGROUND OF THE INVENTION

1. Field of the Invention

The present invention relates to an image processing apparatus for deciding a candidate of an original region corresponding to an original in a read image obtained by reading the original, an image processing method, and a storage medium storing a program.

2. Description of the Related Art

As a method of detecting an original region corresponding to an original placed on an image reading apparatus, there is conventionally a method of binarizing a read original, and dividing the original by labeling and projection, thereby cutting out an original region. Japanese Patent Laid-Open No. 2010-035162 describes a technique of detecting an original region by detecting the edges of an original in a read image.

However, the conventional method of cutting out an original detects the contrast difference between an original and a pressing sheet for pressing the original. If, therefore, the obtained contrast difference is smaller than a given value, it may be impossible to specify an original region. For example, in an original printed on a thin white paper sheet such as a receipt sheet, the boundary between the original and the pressing sheet may be unclear, and it may be impossible to specify an original region.

SUMMARY OF THE INVENTION

An aspect of the present invention is to eliminate the above-mentioned problems with the conventional technology. The present invention provides an image processing apparatus for appropriately deciding a candidate of an original region corresponding to an original in a read image, an image processing method, and a storage medium storing a program.

The present invention in one aspect provides an image processing apparatus comprising: an acquisition unit configured to acquire a read image which has been obtained by reading at least one original by a reading apparatus and includes an original region corresponding to each of the at least one original; a specifying unit configured to specify an object corresponding to contents of the original in the read image based on a group of pixels corresponding to luminance values smaller than a predetermined luminance value in the read image acquired by the acquisition unit; and a decision unit configured to decide a candidate region corresponding to each of the at least one original region by determining, in a case where the specifying unit specifies a plurality of objects, whether the plurality of objects are included in one original region.

According to the present invention, it is possible to appropriately decide a candidate of an original region corresponding to an original in a read image.

Further features of the present invention will become apparent from the following description of exemplary embodiments with reference to the attached drawings.

BRIEF DESCRIPTION OF THE DRAWINGS

FIG. 3 is a flowchart illustrating the procedure of image reading processing;
FIG. 4 is a flowchart illustrating the procedure of processing in step S308;
FIGS. 5A to 5E are views for explaining integration of labels.

DESCRIPTION OF THE EMBODIMENTS

Figure 1:
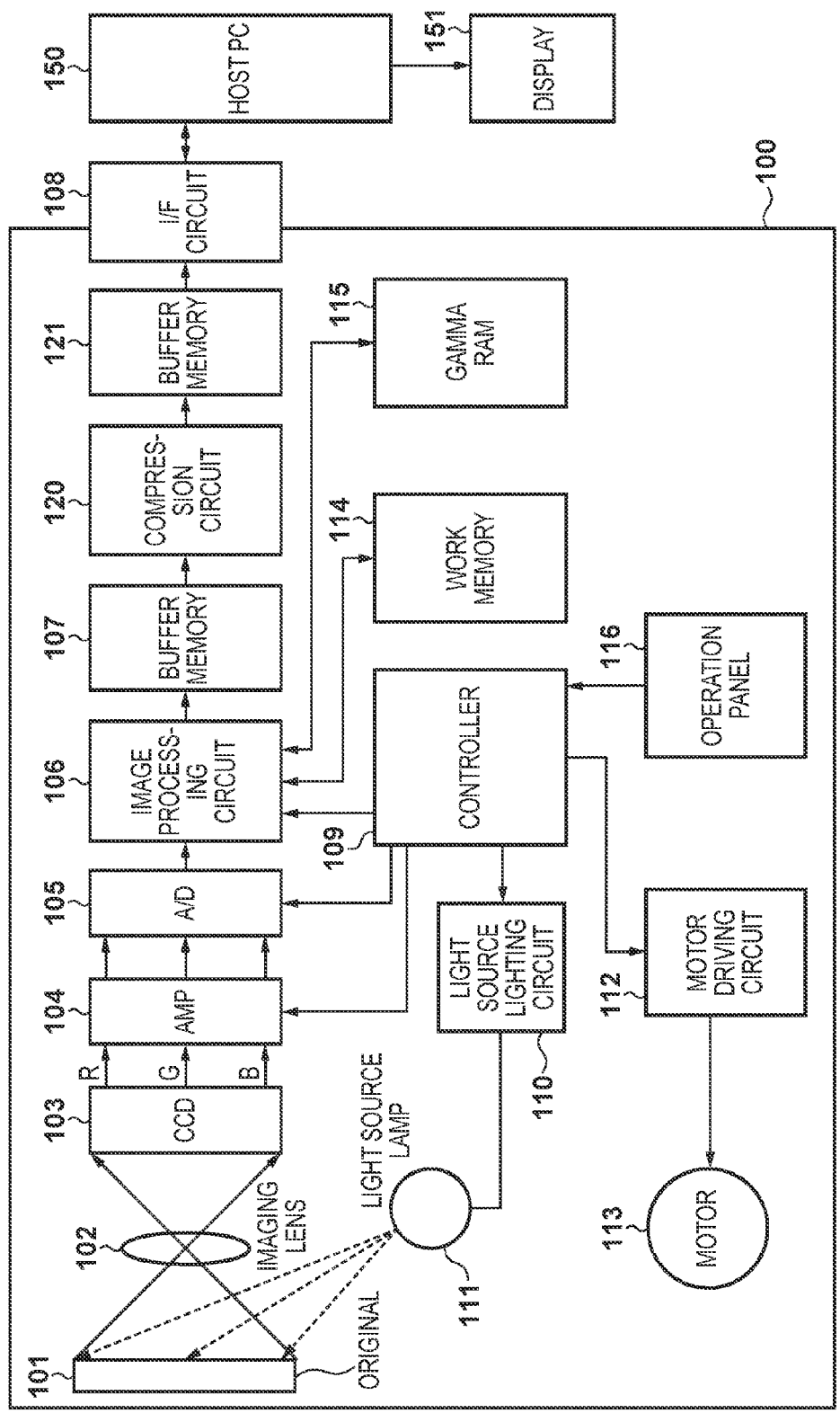
FIG. 1 is a block diagram showing a system arrangement.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

FIG. 1 is a block diagram showing a system arrangement according to an embodiment. This system includes an image reading apparatus 100 and a host PC 150. The image reading apparatus 100 generates image data by optically reading an original 101 as an original sheet placed on an original table. A light source lamp 111 emits reading light toward the original 101 on the original table (not shown) according to a signal from a light source lighting circuit 110. The emitted light is reflected by the original 101, and the reflected light forms an image on a solid-state image sensor 103 through an imaging lens 102. The solid-state image sensor 103 is a line image sensor (line sensor) such as a CCD sensor. The solid-state image sensor 103 will also be referred to as the CCD 103 hereinafter. A cover (cover portion) is arranged on the original table of the image reading apparatus 100 so as to cover an original reading region, and includes a white region at a position facing the reading region. The light from the light source is reflected by the original 101 and the white region as the background of the original 101, and received by the line image sensor.

Also, an original feeder may be mounted above the reading region on the original table of the image reading apparatus 100. In this case, a carriage incorporating the line image sensor is fixed at a predetermined reading position, thereby reading original images while causing a plurality of originals to pass above the carriage. A white reference plate or white roller for obtaining a white reference is arranged above the reading position corresponding to the fixed position of the carriage in the line direction of the line image sensor.

An amplifier 104 amplifies an analog signal corresponding to the read image output from the CCD 103, and outputs the resultant signal to the succeeding stage. An A/D converter 105 converts the analog signal output from the amplifier 104 into a digital signal. An image processing circuit 106 performs various image processes for image data of the digital signal output from the A/D converter 105. The image processing circuit 106 performs, for example, offset correction, shading correction, digital gain adjustment, color balance adjustment, color masking conversion, and resolution conversion in the main and sub scanning directions. The image processing circuit 106 also performs binarization processing with respect to a luminance value as a reference, labeling processing, label integration processing, cut-out processing, and the like (to be described later).

The buffer memory 107 is, for example, a RAM, and temporarily stores the image data having undergone image processing of the image processing circuit 106. A compression circuit 120 compresses the image data stored in the buffer memory 107. A buffer memory 121 is, for example, a RAM, and temporarily stores the image data compressed by the compression circuit 120. The buffer memory 121 is used as a memory to stand by for transfer from the image reading apparatus 100 to the host PC 150. An interface circuit 108 transmits/receives various commands, data, and the like to/from the host PC 150. A SCSI interface, parallel interface, USB interface, IEEE1394 interface, LAN interface, wireless LAN interface, or the like is used as the interface circuit 108.

A work memory 114 is a temporary working memory used when the image processing circuit 106 performs image processing. For example, the work memory 114 is used to correct an RGB line offset of image signals from RGB line sensors parallelly arranged with a predetermined offset on the line image sensor 103. The work memory 114 is also used to temporarily store various data in shading correction or the like. A gamma RAM 115 stores a density-gamma conversion lookup table (LUT), and is used for gamma correction.

A controller 109 includes a CPU or MPU, and comprehensively controls the overall image reading apparatus 100 including the respective units shown in FIG. 1 in accordance with instruction commands transmitted from the host PC 150. An operation panel 116 includes a display and hard keys. For example, the user can set various reading settings via a setting screen displayed on the display. Operation information (pressing of a button or the like) accepted by the operation panel 116 from the user is output to the controller 109. The operation information can be transmitted to the host PC 150 via the interface circuit 108.

A motor driving circuit 112 controls a motor 113 which drives a reading carriage (not shown) including the light source lamp 111, CCD 103, and imaging lens 102. The motor 113 is, for example, a stepping motor, and the motor driving circuit 112 outputs an excitation signal to the motor 113 according to a control signal from the controller 109. The carriage is provided in a driving mechanism such as a belt or guide shaft, and can relatively move with respect to the original table. As described above, the image reading apparatus 100 can fix the carriage at the predetermined reading position, and read original images while causing a plurality of originals to pass above the carriage.

The image reading apparatus 100 reads an original with the arrangement including the light source lamp 111 and the 3-line CCD sensor 103 for reading three colors of R, G, and B. However, the image reading apparatus 100 may read an original with the arrangement including a monochromatic 1-line image sensor and an RGB 3-color light source which can 109 turns on one of the 3-color light source LEDs by the light source lighting circuit 110, and the image sensor receives the reflected light of the light emitted by the light source. Then, an original is read by sequentially switching LEDs to be turned on, thereby performing color decomposition in accordance with the color emitted by the light source, and reading an original image.

The host PC 150 is connected to a monitor display 151, and can display various setting screens and the like for operating the image reading apparatus 100.

Figure 2:
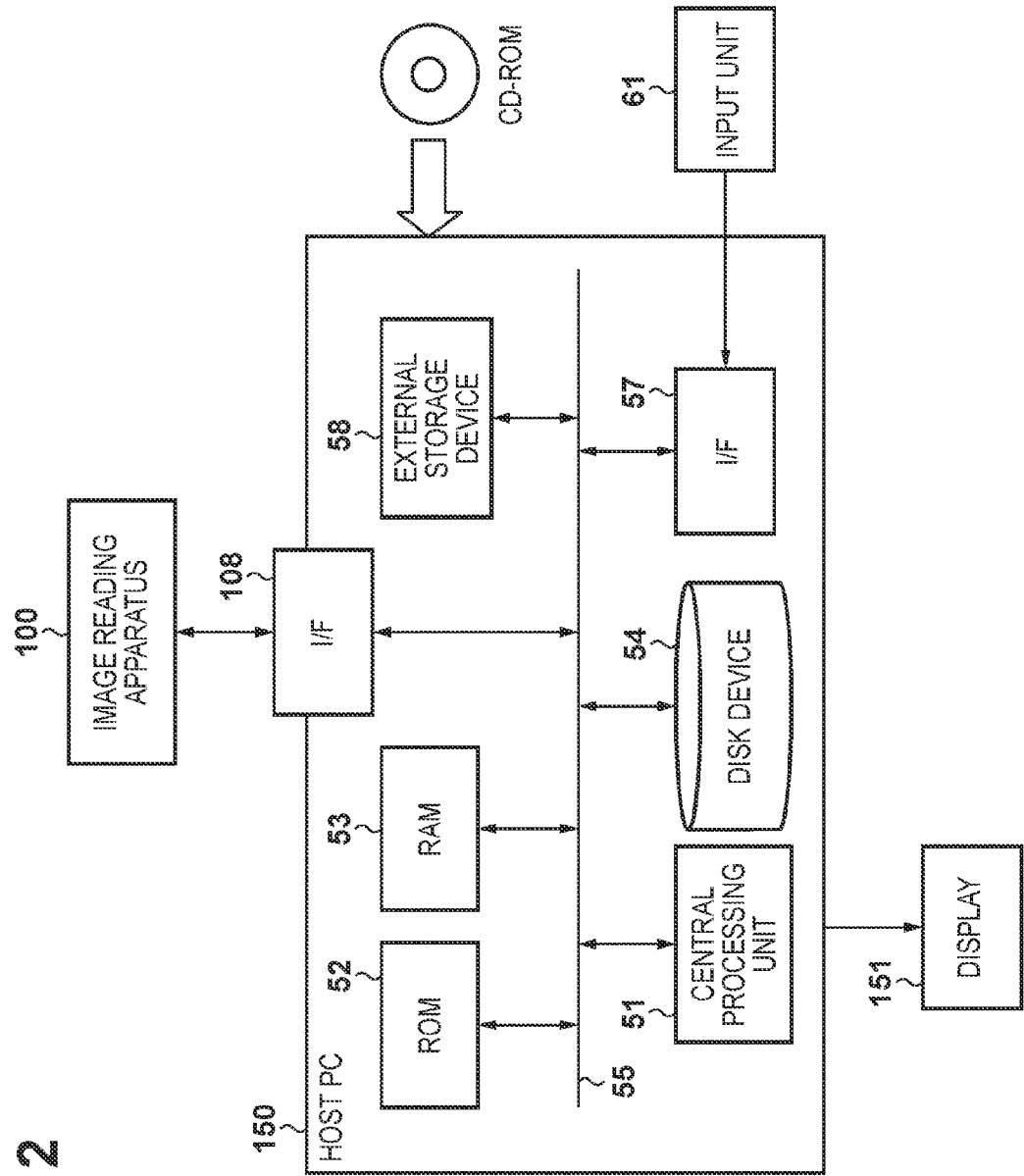
FIG. 2 is a block diagram showing the schematic arrangement of a host PC.

FIG. 2 is a block diagram showing the schematic arrangement of the host PC 150. The host PC 150 is, for example, a general-purpose PC, and is used to control the image reading apparatus 100 in the arrangement shown in FIG. 1. The host PC 150 includes a central processing unit 51 (a CPU, an MPU, or the like), a ROM 52, a RAM 53, a disk device 54, a bus 55, I/Fs 56 and 57, and an external storage device 58. The ROM 52 stores a program for implementing the operation according to this embodiment. The RAM 53 is used as a storage area and work area which are necessary for executing the program. The central processing unit 51 loads the program stored in the ROM 52 into the RAM 53, and executes it.

The bus 55 connects the above-described blocks so as to transmit/receive data. The interface (I/F) 56 is an interface for communicating with the image reading apparatus 100. Similarly to the interface circuit 108 of the image reading apparatus 100, the I/F 56 is implemented in various interface forms such as a USB interface and IEEE1394 interface. The I/F 57 is connected to an input unit 61 such as a pointing device or keyboard. The external storage device 58 drives an external storage medium such as a DVD-ROM or CD-ROM. Instead of storing the program in the ROM 52, various programs stored in the external storage medium may be read out and downloaded via the I/F 57. Alternatively, a program may be downloaded across a network via a network connector (not shown).

The operation according to this embodiment may be implemented by the host PC 150, as described above, or by the controller 109 of the image reading apparatus 100 or both the apparatuses. If the operation is implemented by both the apparatuses, the image reading apparatus 100 functions as a reading unit.

FIGS. 3 and 4 are flowcharts illustrating the procedure of processing in which the image reading apparatus 100 performs an image reading operation instructed by the host PC 150. In step S301, the user places an original on the original table of the image reading apparatus 100, and instructs to start a reading operation (scan) on the operation panel 116. Under the control of the controller 109 of the image reading apparatus 100, the original is read, and a read image including an original region corresponding to the original is generated in the work memory 114.

In this embodiment, a plurality of white receipt sheets shown in FIG. 5B are placed on the original table as originals. At this time, the controller 109 displays, on the operation panel 116, a notification screen for notifying the user of an original placement method to place the originals with an interval of, for example, 10 mm or more so as to prevent the originals from contacting each other. As a method of notifying the user, another method such as announcement information of various media to the user may be used.

In step S302, the light source lamp 111 and the CCD 103 are used to read the originals, thereby acquiring image data. The acquired image data is binarized. FIG. 5A is a view showing a binarization result. Binarization processing may be performed by, for example, determining whether a read luminance value is equal to or larger than a predetermined threshold. A dotted line shown in FIG. 5A is drawn for the descriptive purpose. This line does not actually appear in the data having undergone the binarization processing since the unclear boundaries of the white receipt sheets cannot be detected.

FIG. 5B shows actual original regions. As shown in FIG. 5B, in step S301, the user places two receipt sheets 502 and 503 at arbitrary positions on the original table at arbitrary angles. In step S303, labeling processing is executed for the data having undergone the binarization processing. The labeling processing is performed to group neighboring pixels having the same value (for example, the same luminance value) among the binarized pixels shown in FIG. 5A, and specify the pixel groups as objects included in the originals. More specifically, among pixels which have been determined as "black: luminance value of 0" in the binarized read image, a group of continuous pixels is specified. Among the plurality of thus specified pixel groups, pixel groups whose distance is short (for example, the distance is shorter than a threshold C) are grouped as a pixel group included in one character.

Figure 5C:
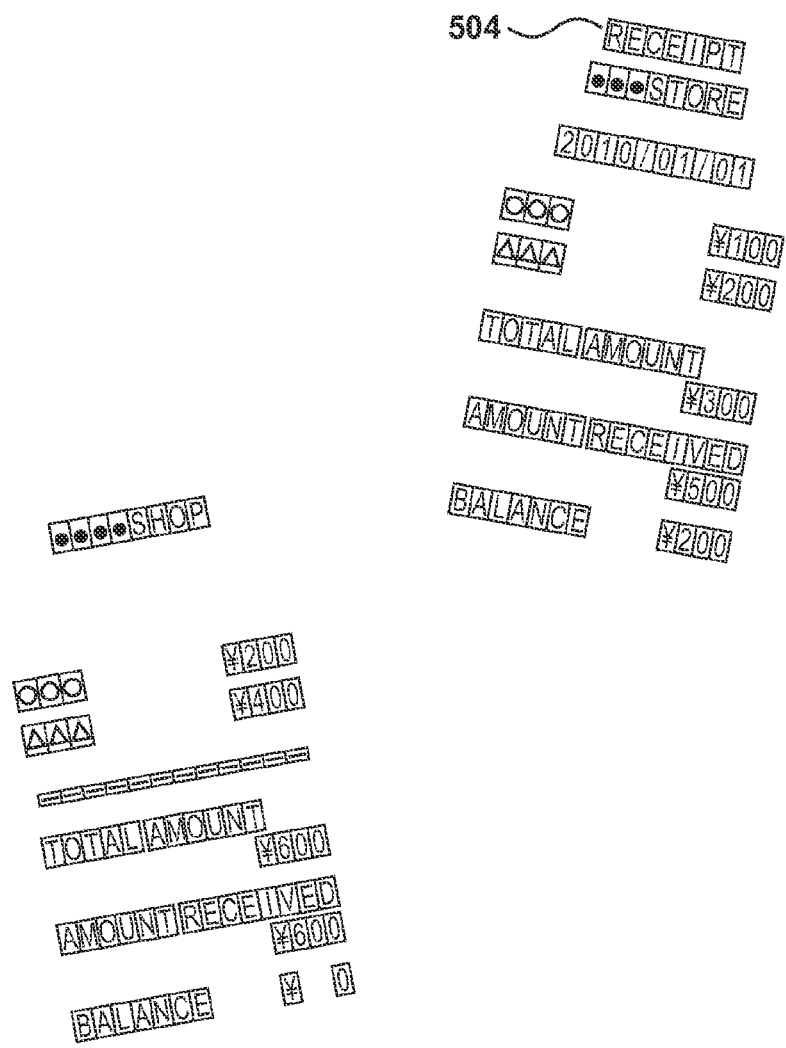

Pixels in one group are assigned with the same label value. In the labeling processing, when another pixel group is found, a value obtained by incrementing the largest one of the label values used for assignment so far is assigned. As a result, upon completion of the labeling processing, the different label values are assigned for the respective groups, and the largest label value in the image data indicates the total number of labels. FIG. 5C is a view showing a labeling result. A region surrounded by a rectangle 504 indicates a region where the same label value is assigned, and almost corresponds to a region of one character.

In step S304, variables representing label values which are to be used in the subsequent loop processing are initialized. In this example, labels i and j and the total number L of labels are set and initialized. The total number L of labels is that acquired in the processing in step S303. The labels i and j are initialized to i=1 and j=i+1. The loop processing from step S305 to step S307 is sequentially performed using a combination of labels such as a combination of labels 1 and 2 or labels 2 and 3.

In step S305, it is determined whether the distance between the labels i and j is shorter than a threshold A. In the first loop processing, the distance between the labels 1 and 2 is determined. Note that the distance between the barycenters of the label regions may be used as the distance between the labels. Alternatively, the shortest one of lengths between the vertices of rectangles respectively including the label regions may be used. In this embodiment, the threshold is 10 mm corresponding to the value which has been notified to the user in step S301. However, another value may be used. The threshold is not limited to this distance, and may be, for example, the number of pixels of the read image. That is, in step S305, it may be determined whether the number of pixels between the labels exceeds a predetermined number of pixels. The number of pixels corresponding to the distance changes depending on the reading resolution. To cope with this, a threshold (the number of pixels) according to the reading resolution in the reading operation may be dynamically calculated, and the calculated threshold (the number of pixels) may be used. In this case, a threshold (the number of pixels) may be decided so that the actual distance is constant regardless of the reading resolution.

In step S305, pixel groups whose distance is shorter than the threshold C have already been grouped as pixel groups included in one character in the processing in step S303. Therefore, the distance A may be set to be longer than the distance C.

Figure 5D:
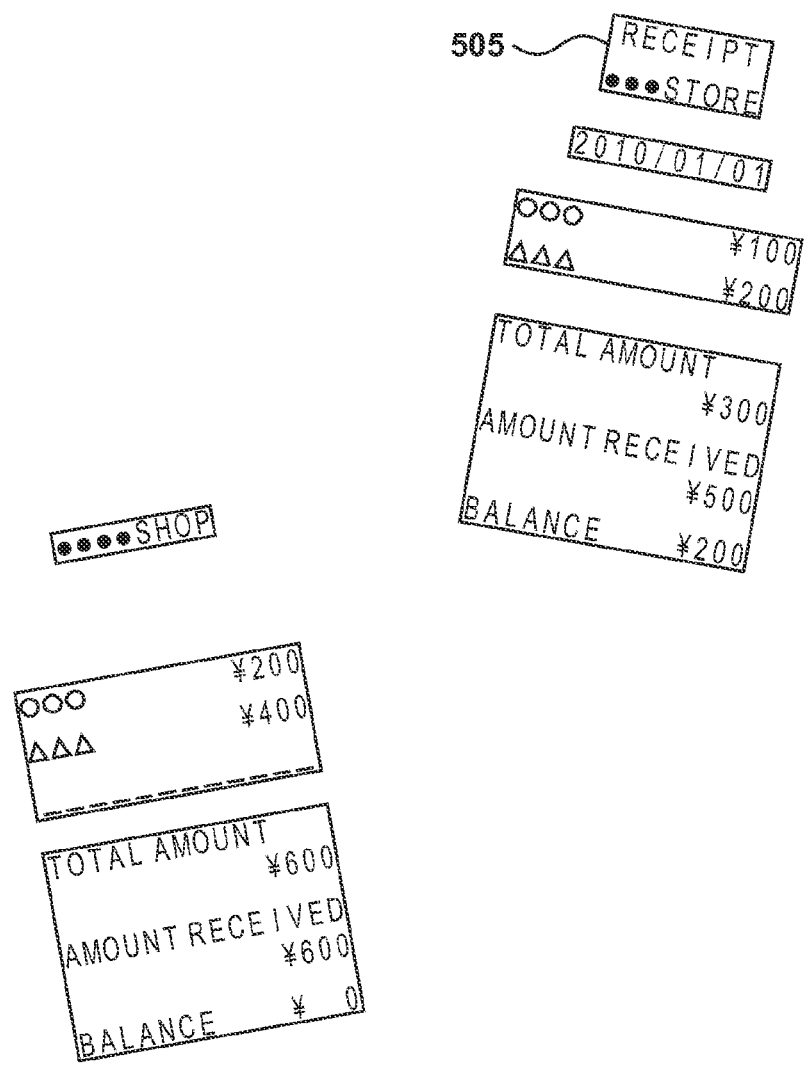

If it is determined in step S305 that the distance between the labels i and j is shorter than the threshold A, the process advances to step S306 to set all the label values of the pixel groups included in the label j to the value of the label i. The processing in step S306 can set, as the same label, the labels i and j whose distance is shorter than 10 mm. In this case, the total number L of labels is decremented by 1. On the other hand, if it is determined that the distance between the labels i and j is not smaller than the threshold A, the process advances to step S307 without executing the processing in step S306. In step S307, it is determined whether the processes in steps S305 and S306 have been performed for all the combinations of labels. Until it is determined that the processes have been performed for all the combinations of labels, the processes in steps S305 and S306 are repeated. If it is determined that the processes have been performed for all the combinations of labels, the process advances to step S308. FIG. 5D is a view showing a result obtained by completing the loop processing from step S305 to S306. As shown in FIG. 5D, labels whose distance is shorter than the threshold A, that is, labels within the predetermined distance have the same label value.

In step S308, a tilt is obtained for each label. The processing in step S308 will be described later with reference to FIG. 4.

In step S309, the variables representing the label values are initialized again for subsequent loop processing from step S310 to step S312. In step S310, it is determined whether the tilts of the labels i and j are equal to each other and the distance between the labels i and j is shorter than a threshold B. Note that the distance between the barycenters of the label regions may be used as the distance between the labels. Alternatively, the shortest one of lengths between the vertices of rectangles respectively including the label regions may be used. The threshold B may be a value settable in advance, or a value proportional to a font size in points which is the size of the labeling region acquired in step S303.

Note that in this flowchart, the labels whose distance is shorter than the threshold A have already been decided as one label in steps S305 and S306. Therefore, a value larger than the threshold A may be used as the threshold B in step S310.

If it is determined in step S310 that the tilts of the labels i and j are equal to each other and the distance between the labels i and j is shorter than the threshold B, the process advances to step S311 to set all the label values of the pixel groups included in the label j to the value of the label i. Note that the processing of determining in step S310 whether the tilts are equal to each other may consider a predetermined error. If, for example, a tilt difference is equal to or smaller than a predetermined angle, it may be determined that the tilts are equal to each other.

The processing in step S311 can set, as the same label, the labels i and j whose distance is shorter than the threshold B. In this case, the total number L of labels is decremented by 1. On the other hand, if it is determined that the tilts of the labels i and j are not equal to each other or the distance between the labels i and j is not smaller than the threshold B, the process advances to step S312 without executing the processing in step S311. In step S312, it is determined whether the processes in steps S310 and S311 have been performed for all the combinations of labels. Until it is determined that the processes have been performed for all the combinations of labels, the processes in steps S310 and S311 are repeated. If it is determined that the processes have been performed for all the combinations of labels, the process advances to step S313.

In step S313, rectangular regions each of which includes the labeling region of each label and has the tilt obtained in step S308 are created. The rectangular regions created in step S313 are decided as candidates of the original regions corresponding to the originals placed on the original table by the user. If the longitudinal and lateral lengths of each rectangular region are different, the region is a rectangle. If the longitudinal and lateral lengths are equal to each other, a square region is decided.

Figure 5E:
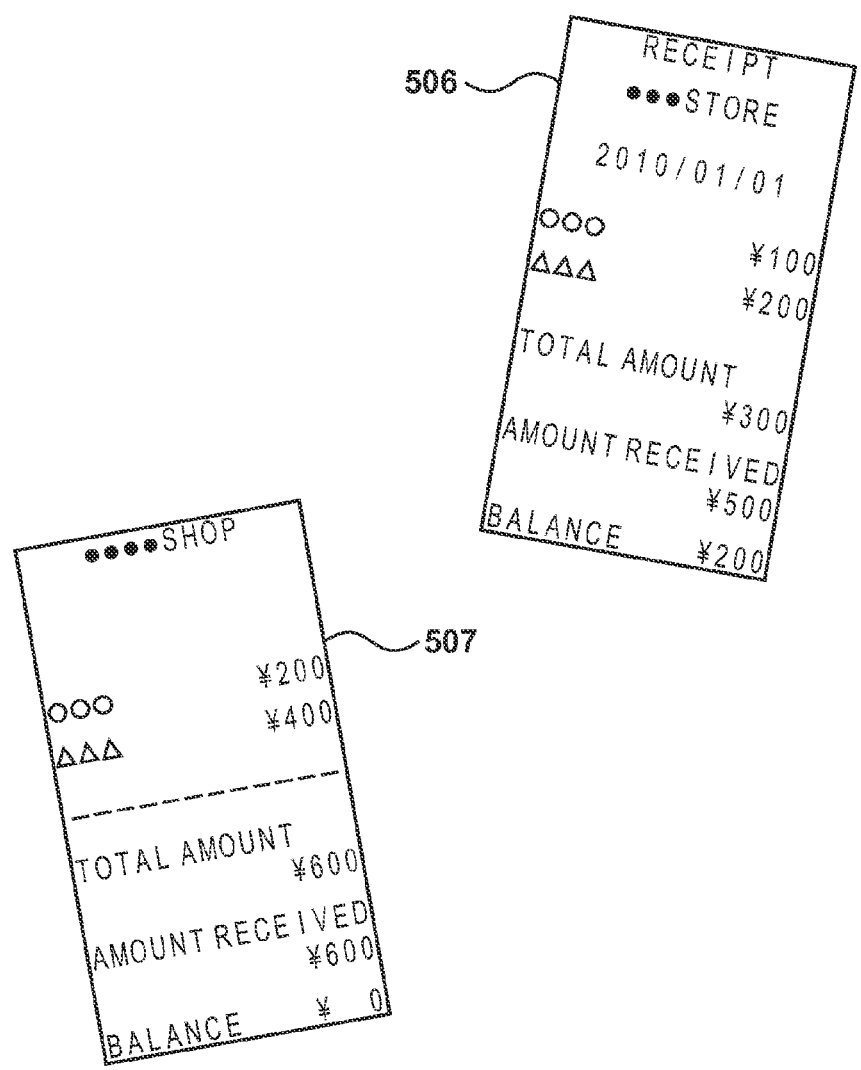

In the example shown in FIGS. 5A to 5E, cutout regions corresponding to the sizes of the receipt sheets placed by the user are decided. FIG. 5E is a view showing the result of creating the rectangular regions in step S313. As shown in FIG. 5E, rectangular regions 506 and 507 (cutout regions) are created to include the respective labels.

In the example shown in FIGS. 5D and 5E, the labels included in the rectangular regions 506 and 507 are placed to have some distance, and their tilts are different from each other. In step S310, these labels satisfy neither the condition about the distance (the distance is equal to or longer than the threshold B) nor the condition about the tilt under which the labels are decided as the same label, and thus are decided as different labels (different original regions).

As described above, in this embodiment, integration of labels is repeated a plurality of times by using the fact that the tilts of characters or the like existing in the same original (receipt sheet) are equal to each other in many cases. As a result, it is possible to collectively cut out information printed on one original (one receipt sheet). The rectangular regions shown in FIG. 5E are rectangles in which the labels detected in step S303 are inscribed, and may have sizes different from the actual sizes of the receipt sheets shown in FIG. 5B. Note that the cut-out accuracy is high enough to manage the originals on various applications such as home accounting software.

After candidate regions as candidates of the original regions are decided in the above processing, images of the original regions are cut out from the read image acquired in step S301. Then, display control processing of displaying the cutout regions on the operation panel 116 or the monitor display 151 may be executed. Alternatively, for example, the host PC 150 or the image reading apparatus 100 may execute print control processing of causing a printing apparatus (not shown) to print the images of the candidates regions. Furthermore, regions extended by a given amount such as 10 mm may be used as cutout regions in consideration of the appearances of images.

FIG. 4 is a flowchart illustrating the procedure of the processing in step S308. In step S401, a processing target label (object) in step S308 is specified. For example, an area of the same capacity as that of the memory storing the result of the labeling processing of FIG. 3 is allocated in the RAM or the like, and the processing target label may be copied to the area.

Figure 6A:
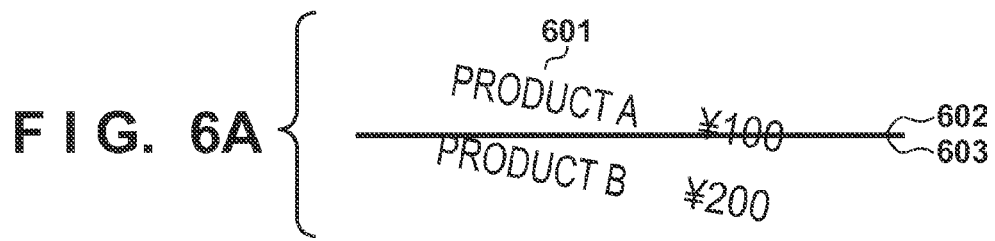
FIGS. 6A to 6E are views for explaining decision of the angle of a label.

In step S402, a parameter θ representing the angle of the label is prepared, and set to the initial value (0°). In step S403, two straight lines L1 and L2 each having a tilt of the angle θ are set for the processing target label. FIG. 6A is a view showing a processing result in step S403. A content 601 indicated by "product A ¥100 product B ¥200" in FIG. 6A is the label specified in step S401, and straight lines 602 and 603 correspond to the straight lines L1 and L2. In the processing in step S403, as shown in FIG. 6A, the straight lines 602 and 603 are set to pass the center of the processing target label. At this time, the straight lines 602 and 603 are set to overlap each other.

Figure 6B:
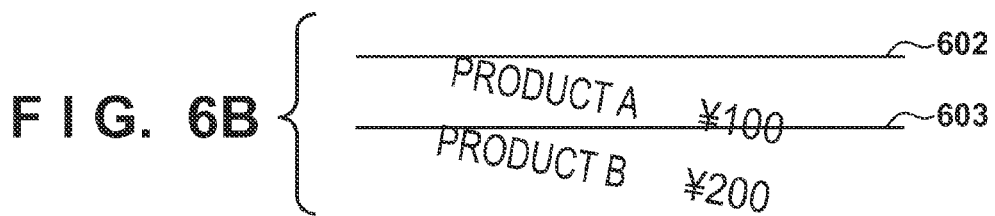

In step S404, the straight line 602 is translated by a predetermined small unit in a direction of the angle θ+90°. The predetermined small unit is, for example, one pixel. In step S405, it is determined whether the processing target label exists on the straight line 602. If it is determined that the processing target label exists on the straight line 602, the process is repeated from step S404; otherwise, the process advances to step S406. FIG. 6B is a view showing a state in which, as a result of translation, it is determined that the processing target label does not exist on the straight line 602, and the process advances to step S406.

Figure 6C:
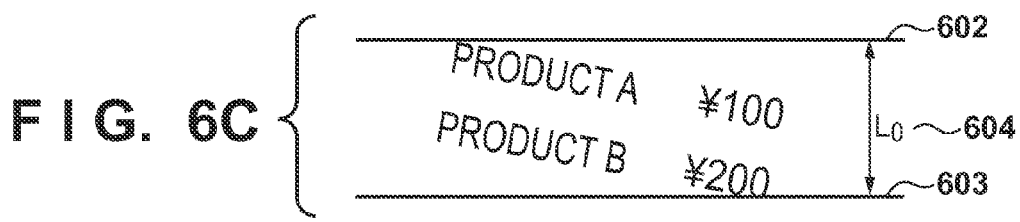

In step S406, the straight line 603 is translated by a predetermined small unit in a direction of the angle θ-90°. The predetermined small unit is, for example, one pixel. In step S407, it is determined whether the processing target label exists on the straight line 603. If it is determined that the processing target label exists on the straight line 603, the process is repeated from step S406; otherwise, the process advances to step S408. FIG. 6C is a view showing a state in which, as a result of translation, it is determined that the processing target label does not exist on the straight line 603, and the process advances to step S408.

In step S408, a distance 604 between the straight lines 602 and 603 is obtained and saved in a storage area such as the RAM. In step S409, a predetermined small unit angle is added to the current angle θ. The small unit angle may be decided according to the calculation accuracy of the image reading apparatus 100. In this embodiment, a desired angle falling within the range from 0.5° to 1.0° is sequentially added to the current angle θ.

In step S410, it is determined whether the angle θ obtained after the processing in step S409 is larger than 90°. If it is determined that the angle θ is larger than 90°, the process advances to step S411; otherwise, the process is repeated from step S403.

Figure 6D:
Figure 6E:
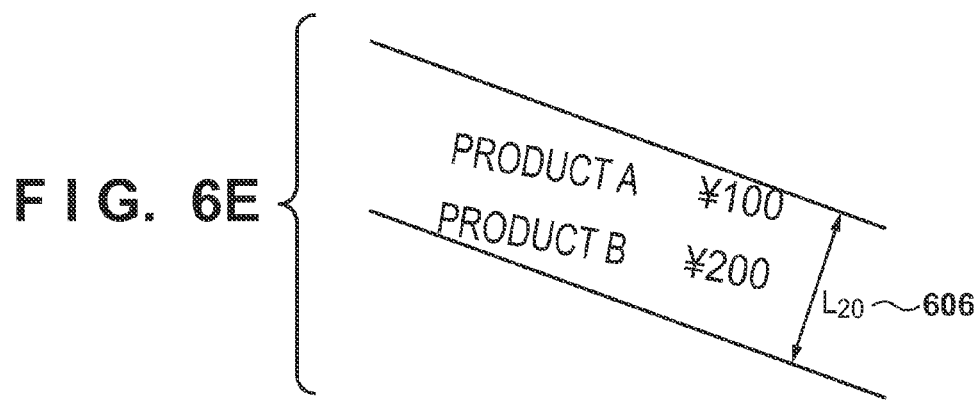

In step S411, the shortest one of the distances 604 corresponding to the respective angles obtained in step S408 is specified. The angle θ corresponding to the shortest distance 604 is decided as the angle of the processing target label. FIG. 6D shows a distance 605 when the angle θ=10°. FIG. 6E shows a distance 606 when the angle θ=20°. In this embodiment, the distance 605 is specified as the shortest distance, and the angle θ=10° corresponding to the distance 605 is decided as the angle of the content (label) 601.

With the processing shown in FIG. 4, it is possible to obtain the tilt of the label (the content 601 in the example of FIGS. 6A to 6E) with respect to the read image.

According to the aforementioned embodiment, it is possible to specify a processing target label (object) in a read image obtained by reading, by the reading apparatus, the entire surface of the original table on which an original is placed. If a plurality of objects are specified, it is determined whether the plurality of objects correspond to one original or different originals in accordance with the distance between the objects and the tilt difference between the objects. This can appropriately decide an original region even if an original such as a receipt whose edges are difficult to determine is read.

Note that the aforementioned embodiment has described a case in which a character in the read image is determined by labeling. The present invention, however, is not limited to this. For example, the image reading apparatus 100 or the host PC 150 may include an OCR (Optical Character Reader) (not shown), and perform character recognition. As described above, the processing according to this embodiment may be executed by the image reading apparatus 100 or the host PC 150. Alternatively, the processing may be shared and executed by both the image reading apparatus 100 and the host PC 150.

If the host PC 150 executes the processing, it acquires, from the image reading apparatus 100, the read image obtained by reading the originals by the image reading apparatus 100 in step S301 of FIG. 3. At this time, a so-called pull scan in which the user instructs the host PC 150 to read the originals may be performed or a so-called push scan in which the user instructs the image reading apparatus 100 to read the originals may be performed.

If the image reading apparatus 100 and the host PC 150 share the processing, various methods can be used to share the processing. For example, the user instructs the host PC 150 to read the originals. The image reading apparatus 100 can execute the processing up to the labeling processing in step S303, and the host PC can execute the subsequent processing.

While issuing a reading instruction, the user may instruct whether to crop an original region. This instruction may be issued to either the host PC 150 or the image reading apparatus 100. In this case, the processes in step S302 and subsequent steps of FIG. 3 are executed when the user instructs to crop an original region. If the user does not instruct to crop an original region, the processes in step S302 and subsequent steps need not be executed.

The aforementioned embodiment assumes a case in which the reading apparatus reads the original such as a receipt whose edges are difficult to detect. Therefore, in FIG. 3, after performing labeling for the read image in step S303, the processes in step S305 and subsequent steps are executed. However, for example, if the edges (for example, four sides) of the original can be detected in the read image, the processes in step S302 and subsequent steps need not be performed. If the edges of the original cannot be detected, the processes in step S302 and subsequent steps may be performed. If only one label (object) is detected as a result of the labeling processing in step S303, the one object may be decided as an original region without executing the processes in step S304 and subsequent steps.

In the aforementioned embodiment, processing is performed for an image, in which each pixel represents a luminance value, as a read image. However, the present invention is not limited to the luminance value, and processing may be performed for an image in which each pixel represents another component value (for example, a density value such as CMYK). For the density value, a group of pixels with a density value larger than a predetermined one can be specified as an object corresponding to contents of the original.

Furthermore, in the aforementioned embodiment, a case in which a candidate region decided as a candidate of an original region corresponding to an original is cut out from a read image has been explained. The present invention, however, is not limited to this. For example, predetermined image processing such as color conversion may be executed for the candidate region.

The object of the present invention can also be achieved by supplying a storage medium which stores software program codes for implementing the functions of the above-described embodiment to a system or apparatus and causing the computer (or a CPU or MPU) of the system or apparatus to read out and execute the program codes stored in the storage medium. In this case, the program codes read out from the storage medium implement the functions of the above-described embodiment by themselves, and the storage medium which stores the program codes constitutes the present invention.

As the storage medium for supplying the program codes, for example, a flexible disk, hard disk, optical disk, magnetooptical disk, CD-ROM, CD-R, magnetic tape, nonvolatile memory card, ROM, DVD, or the like can be used.

The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-049311, filed Mar. 12, 2014, which is hereby incorporated by reference herein in its entirety.

What is claimed is:

1. An image processing apparatus comprising:
an acquisition unit configured to acquire a read image which has been obtained by reading a plurality of originals by a reading apparatus and includes an original region corresponding to each of the plurality of originals;
a specifying unit configured to specify a plurality of objects as a group of objects each of which corresponds to a group of pixels having luminance values smaller than a predetermined luminance value in the read image acquired by said acquisition unit; and
a tilt determination unit configured to determine a first tilt of a first group of objects and a second tilt of a second group of objects specified by said specifying unit;
a distance determination unit configured to determine a distance between the first group of objects and the second group of objects;

a decision unit configured to decide a candidate region corresponding to each of the plurality of originals based on the first tilt and the second tilt determined by said tilt determination unit and the distance determined by said distance determination unit.

2. The apparatus according to claim 1, further comprising a labeling unit configured to perform labeling processing for the group of pixels corresponding to the luminance values smaller than the predetermined luminance value,
   wherein said specifying unit specifies the group of pixels for which the labeling processing is performed as an object and specifies the plurality of objects as the group of objects.

3. The apparatus according to claim 1, wherein said specifying unit specifies the group of pixels based on one of a luminance value and a density value corresponding to each pixel of the read image.

4. The apparatus according to claim 1, further comprising a cut-out unit configured to perform processing of cutting out at least one candidate region decided by said decision unit from the read image.

5. The apparatus according to claim 4, further comprising a display control unit configured to cause a display device to display an image of the at least one candidate region cut out by said cut-out unit.

6. The apparatus according to claim 4, further comprising a printing control unit configured to cause a printing apparatus to print an image of the at least one candidate region cut out by said cut-out unit.

7. The apparatus according to claim 1, wherein the reading apparatus is included in the image processing apparatus, as a reading unit configured to read an original.

8. An image processing method comprising:
   an acquisition step of acquiring a read image which has been obtained by reading a plurality of originals by a reading apparatus and includes an original region corresponding to each of the plurality of originals;
   a specifying step of specifying a plurality of objects as a group of objects each of which corresponds to a group of pixels having luminance values smaller than a predetermined luminance value in the read image acquired in the acquisition step; and
   a tilt determination step of determining a first tilt of a first group of objects and a second tilt of a second group of objects specified by said specifying step;
   a distance determination step of determining a distance between the first group of objects and the second group of objects;
   a decision step of deciding a candidate region corresponding to each of the plurality of originals based on the first tilt and the second tilt determined by said tilt determination step and the distance determined by said distance determination step.

9. A non-transitory computer-readable storage medium storing a program for causing a computer to execute each step of an image processing method, the method comprising:
   an acquisition step of acquiring a read image which has been obtained by reading a plurality of originals by a reading apparatus and includes an original region corresponding to each of the plurality of originals;
   a specifying step of specifying a plurality of objects as a group of objects each of which corresponds to a group of pixels having luminance values smaller than a predetermined luminance value in the read image acquired by said acquisition step; and
   a tilt determination step of determining a first tilt of a first group of objects and a second tilt of a second group of objects specified by said specifying step;
   a distance determination step of determining a distance between the first group of objects and the second group of objects;
   a decision step of deciding a candidate region corresponding to each of the plurality of originals based on the first tilt and the second tilt determined by said tilt determination step and the distance determined by said distance determination step.

10. The apparatus according to claim 1, wherein said tilt determination unit determines the first tilt and the second tilt by changing angles of two parallel lines that contact with the group of objects and obtaining a distance between the two parallel lines in the changed angle.

11. The apparatus according to claim 1, wherein, in a case where (i) the distance is determined to be within a predetermined distance and (ii) a difference between the first tilt and the second tilt falls within a predetermined range, said decision unit decides the candidate region including the first group of objects and the second group of objects.

12. The apparatus according to claim 11, wherein, in a case where a distance between a first object and a second object of the plurality of objects is less than a second predetermined distance which is less than the predetermined distance, said specifying unit specifies the first object and the second object as objects included in the group of objects.

13. The method according to claim 8, further comprising a labeling step of performing labeling processing for the group of pixels corresponding to the luminance values smaller than the predetermined luminance value,
   wherein said specifying step specifies the group of pixels for which the labeling processing is performed as an object and specifies the plurality of objects as the group of objects.

14. The method according to claim 8, wherein said specifying step specifies the group of pixels based on one of a luminance value and a density value corresponding to each pixel of the read image.

15. The method according to claim 8, further comprising a cut-out step of performing processing of cutting out at least one candidate region decided by said decision step from the read image.

16. The method according to claim 15, further comprising a display control step of causing a display device to display an image of the at least one candidate region cut out by said cut-out step.

17. The method according to claim 15, further comprising a printing control step of causing a printing apparatus to print an image of the at least one candidate region cut out by said cut-out step.

18. The method according to claim 8, wherein said tilt determination step determines the first tilt and the second tilt by changing angles of two parallel lines that contact with the group of objects and obtaining a distance between the two parallel lines in the changed angle.

19. The method according to claim 8, wherein, in a case where (i) the distance is determined to be within a predetermined distance and (ii) a difference between the first tilt and the second tilt falls within a predetermined range, said decision step decides the candidate region including the first group of objects and the second group of objects.

20. The method according to claim 19, wherein, in a case where a distance between a first object and a second object of the plurality of objects is less than a second predetermined distance which is less than the predetermined distance, said specifying step specifies the first object and the second object as objects included in the group of objects.

* * * * *